(12) United States Patent
Nahman et al.

(10) Patent No.: US 10,948,514 B2
(45) Date of Patent: Mar. 16, 2021

(54) CENTER OF GRAVITY SHIFTING FORCE DEVICE

(71) Applicant: Harman International Industries, Inc., Stamford, CT (US)

(72) Inventors: Jaime Elliot Nahman, Oakland, CA (US); Stefan Marti, Oakland, CA (US); Davide Di Censo, Oakland, CA (US); Mirjana Spasojevic, Palo Alto, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 14/954,597

(22) Filed: Nov. 30, 2015

(65) Prior Publication Data

US 2017/0153268 A1    Jun. 1, 2017

(51) Int. Cl.
*G01P 15/135*    (2006.01)
*G06F 3/01*    (2006.01)
*G08B 6/00*    (2006.01)
*G06F 1/16*    (2006.01)
*G01C 21/36*    (2006.01)

(52) U.S. Cl.
CPC ........ *G01P 15/135* (2013.01); *G01C 21/3652* (2013.01); *G06F 1/163* (2013.01); *G06F 3/011* (2013.01); *G06F 3/012* (2013.01); *G06F 3/016* (2013.01); *G08B 6/00* (2013.01)

(58) Field of Classification Search
None
See application file for complete search history.

(56) References Cited

U.S. PATENT DOCUMENTS 5,577,981 A * 11/1996 Jarvik .................. A63B 21/154
434/247
5,844,674 A * 12/1998 Sieben .................. G06F 3/0304
356/139.03

(Continued)

FOREIGN PATENT DOCUMENTS

CA    2917708 A1    1/2015
CN    101583992 A    11/2009

(Continued)

OTHER PUBLICATIONS

"Galvanic vestibular stimulation", Wikipedia, 2 pages, https://en.wikipedia.org/wiki/Galvanic_vestibular_stimulation.

(Continued)

*Primary Examiner* — Adolf Dsouza
(74) *Attorney, Agent, or Firm* — Artegis Law Group, LLP

(57) ABSTRACT

A system for exerting forces on a user. The system includes a user-mounted device including one or more masses, one or more sensors configured to acquire sensor data, and a processor coupled to the one or more sensors. The processor is configured to determine at least one of an orientation and a position associated with the user-mounted device based on the sensor data. The processor is further configured to compute a force to be exerted on the user via the one or more masses based on a force direction associated with a force event and at least one of the orientation and the position. The processor is further configured to generate, based on the force, a control signal to change a position of the one or more masses relative to the user-mounted device.

20 Claims, 12 Drawing Sheets

(56) References Cited

U.S. PATENT DOCUMENTS

| | | | |
|---|---|---|---|
| 6,400,956 | B1 | 6/2002 | Richton |
| 6,891,467 | B2 | 5/2005 | Perttunen et al. |
| 7,664,961 | B2 | 2/2010 | Blattner et al. |
| 7,780,080 | B2 | 8/2010 | Owen et al. |
| 9,058,473 | B2 | 6/2015 | Navratil et al. |
| 9,764,356 | B2 | 9/2017 | Higashino et al. |
| 9,802,225 | B2 | 10/2017 | Houston |
| 9,805,534 | B2 | 10/2017 | Ho et al. |
| 2007/0091063 | A1 | 4/2007 | Nakamura |
| 2009/0076723 | A1 | 3/2009 | Moloney |
| 2011/0314530 | A1 | 12/2011 | Donaldson |
| 2014/0272915 | A1* | 9/2014 | Higashino ........ B06B 1/16 434/365 |
| 2015/0028996 | A1 | 1/2015 | Agrafioti et al. |
| 2015/0044662 | A1 | 2/2015 | Goto et al. |
| 2015/0172832 | A1 | 6/2015 | Sharpe et al. |
| 2015/0347734 | A1 | 12/2015 | Beigi |
| 2016/0008206 | A1* | 1/2016 | Devanaboyina ....... A47C 9/002 601/136 |

FOREIGN PATENT DOCUMENTS

| | | |
|---|---|---|
| EP | 2 881 836 A1 | 6/2015 |
| JP | 2008-077631 A | 4/2008 |
| JP | 2008-209137 A | 9/2008 |
| JP | 2014-178960 A1 | 11/2014 |
| JP | 2015-035039 A | 2/2015 |
| JP | 2015-103250 A | 6/2015 |
| KR | 10-2015-0052614 A | 5/2015 |
| WO | 2014/138504 A2 | 9/2014 |

OTHER PUBLICATIONS

Hemmert et al., "Take me by the Hand: Haptic Compasses in Mobile Devices through Shape Change and Weight Shift", Proceedings: NordiCHI 2010, Oct. 16-20, 2010, 4 pages.

Hemmert et al., "Weight-Shifting Mobiles: Two-Dimensional Gravitational Displays in Mobile Phones", CHI 2010, Media Showcase Session 3, Apr. 10-15, 2010, 5 pages.

Kojima, et al., "Pull-Navi A novel tactile navigation interface by pulling the ears", SIGGRAPH '09 ACM SIGGRAPH 2009 Emerging Technologies Article No. 19, Aug. 3-7, 2009, 1 page.

Maeda, et al., "Shaking the World: Galvanic Vestibular Stimulation as a Novel Sensation Interface", SIGGRAPH '05 ACM SIGGRAPH 2005 Emerging Technologies Article No. 17, Jul. 31-Aug. 4, 2005, 1 page.

International Search Report for Application No. PCT/US2016/056421, dated Nov. 15, 2016, 10 pages.

Extended European Search Report for EP Application No. 16188985.2 dated Mar. 10, 2017.

Final Office Action for U.S. Appl. No. 14/919,555 dated Jan. 2, 2018.

Non-final Office Action for U.S. Appl. No. 14/919,555, dated Jun. 5, 2018, 14 pages.

Extended European Search Report for Application No. 16871220.6 dated Mar. 1, 2018, 8 pages.

Non-final Office Action for U.S. Appl. No. 15/191,271 dated Jun. 20, 2018, 19 pages.

* cited by examiner

CENTER OF GRAVITY SHIFTING FORCE DEVICE

BACKGROUND

Field of the Embodiments

The various embodiments relate generally to human-machine interfaces and, more specifically, to a center of gravity shifting force device.

Description of the Related Art

One problem with many electronic devices is the reliance on traditional output methodologies. In particular, conventional mobile devices and wearable devices typically rely on visual feedback via a screen and/or auditory feedback via one or more speakers to convey information to a user. For example, mobile phones typically provide navigation instructions by displaying a graphical map to a user and supplementing the graphical map with auditory navigation instructions.

However, while visual and auditory feedback often are effective in conveying detailed information to a user, in certain situations, a user's visual and/or auditory channels may become information-saturated. In such situations, the user may be unable to effectively receive additional information via his or her visual and/or auditory channels. For example, when a user is communicating via e-mail or text message, or when the user is engaging in a voice conversation, the user's visual or auditory channels may be unable to effectively receive and process additional visual or auditory information, such as the visual and/or auditory navigation instructions described above. Consequently, when the additional visual or auditory information is presented to the user, the information may be ignored by the user or inaccurately perceived by the user.

Further, in some situations, overwhelming a user with additional visual and/or auditory information may distract a user, creating a potentially dangerous situation. For example, when a user is driving a vehicle or navigating on foot, requiring the user to look down at a screen to view navigation instructions requires the user to divert his/her attention away from the act of driving, walking, running, etc. Such diversions reduce the ability of the user to safely avoid obstacles in the surrounding environment, potentially compromising the safety of both the user and those in the surrounding environment.

As the foregoing illustrates, non-visual and non-auditory techniques for providing information to a user would be useful.

SUMMARY

Embodiments of the present disclosure set forth a method for exerting forces on a user. The method includes determining, based on sensor data, an orientation and a position associated with a force device. The method further includes computing a force to be exerted on the user via one or more masses included in the force device based on a force direction associated with a force event, the orientation, and the position. The method further includes generating, based on the force, a control signal to change a position of the one or more masses relative to the force device.

Further embodiments provide, among other things, a system and a non-transitory computer-readable storage medium configured to implement the techniques set forth above.

At least one advantage of the disclosed technique is that information can be provided to a user without overwhelming the user's visual and auditory channels. Accordingly, the user can receive instructions, alerts, and notifications while simultaneously receiving other types of information via his or her visual and/or auditory channels, without creating potentially dangerous situations. Further, by exerting forces on the user in response to changes to the orientation of the force device, the techniques described herein can assist a user in maintaining his or her balance and/or posture.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

DETAILED DESCRIPTION

In the following description, numerous specific details are set forth to provide a more thorough understanding of the embodiments of the present disclosure. However, it will be apparent to one of skill in the art that the embodiments of the present disclosure may be practiced without one or more of these specific details.

Figure 1A:
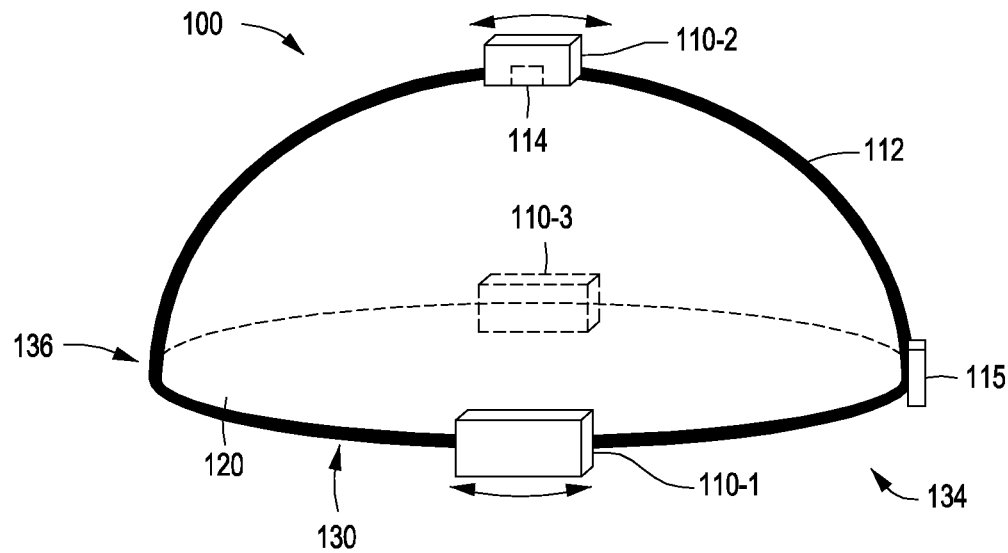
FIGS. 1A-1C illustrates a force device for exerting forces on a user, according to various embodiments.
Figure 1B:
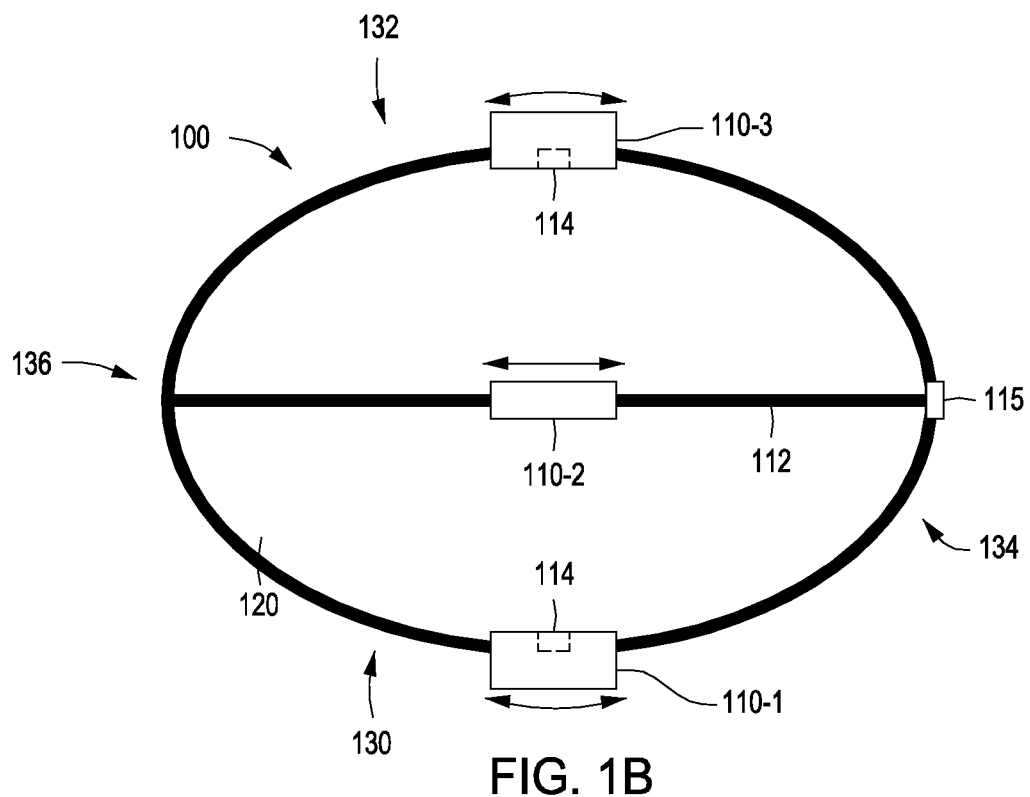
Figure 1C:
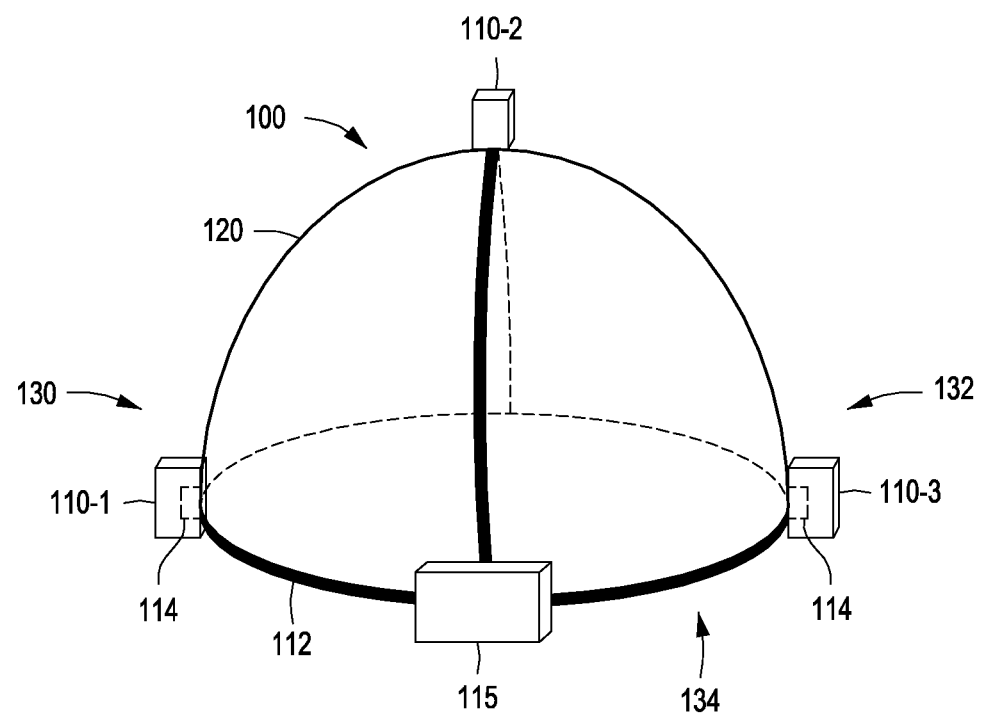

FIGS. 1A-1C illustrate a force device 100 for exerting forces on a user, according to various embodiments. The force device 100 may include, without limitation, one or more masses 110, one or more tracks 112, one or more force control modules 115, and a head support 120. The masses 110 generate forces on the user, for example, and without limitation, by moving along the tracks 112 to modify the center of gravity of the force device 100. In some embodiments, the masses 110 exert forces on the user based on force events that are received and/or generated by the force device 100. For example, and without limitation, a force event received by the force device 100 could specify a type of force (e.g., linear forces, rotational forces, etc.) to be exerted on a user via the masses 110, a direction in which a force is to be exerted, and/or a magnitude of a force to be exerted. In addition, a force event may specify the time at which exertion of a force is to be initiated and/or terminated, a duration of time for which a force is to be exerted, and/or the position and/or orientation of the force device 100 at which the exertion of a force is to be initiated and/or terminated.

In general, force events are intended to communicate various types of information to a user. For example, and without limitation, force events could be generated to communicate navigation instructions to a user, to provide the user with information associated with objects in the surrounding environment, and to provide the user with alert information, such as when someone is attempting to contact the user or when the user is potentially in danger. Additionally, in some embodiments, force events could be generated to communicate other types of information to a user, such as subconscious and/or haptic information (e.g., via a user's vestibular sense), information intended to instruct a user to correct his or her balance or posture, and information intended to cancel out various types of involuntary user movements (e.g., stereotypy).

The force control module 115 is configured to receive sensor data, reposition the masses 110, and coordinate the overall operation of the force device 100. In general, the force control module 115 operates actuators 114 coupled to the masses 110 and/or to the tracks 112 to change the position(s) of the masses 110 relative to the force device 100. Changing the position of the masses 110 alters the center of gravity of the force device 100 which, in turn, generates forces on a user's head and/or body. The exertion of forces on a user may serve a variety of purposes.

Figure 2:
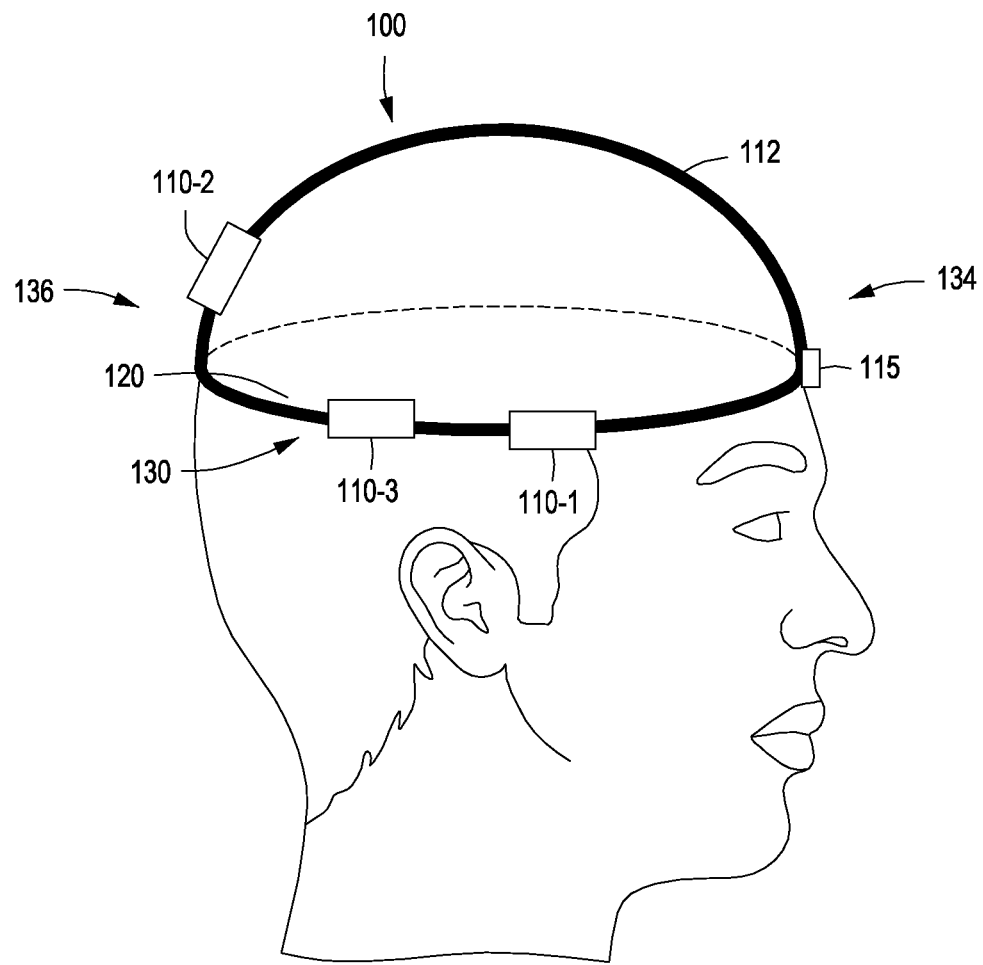
FIG. 2 illustrates how different forces may be exerted on a user via the force device of FIGS. 1A-1C, according to various embodiments.

In some embodiments, slight forces are exerted on a user to indicate that the user should look or move in a particular direction or to draw the user's attention to a particular object or location in the environment. For example, and without limitation, the center of gravity of the force device 100 could be modified by moving one or more masses 110 towards the right side 130 of the force device 100, as shown in FIG. 2, which illustrates how different forces could be exerted on a user via the force device 100 of FIGS. 1A-1C, according to various embodiments. Such a force could be exerted on a user to indicate that the user should turn right down a particular path in order to navigate to a particular destination. In another non-limiting example, the center of gravity of the force device 100 could be modified to exert a force on a user and alert the user of a dangerous situation, such as when a vehicle is approaching the user from a certain direction at a high rate of speed. In addition, a series of forces could be exerted on the user by repeatedly modifying the center of gravity, for example, and without limitation, to indicate that the user has taken a wrong turn or is in a dangerous situation.

In yet another non-limiting example, forces could be exerted on a user to simulate specific actions or experiences, such as when a user is interacting with a virtual reality device. In still another non-limiting example, a force or force pattern could be used to provide a notification to a user, such as a notification that the user is receiving an incoming phone call. Additionally, a gentle tapping force pattern could be used to provide a more subtle notification—akin to being tapped on the shoulder—such as when a user is listening to music via headphones, and one or more sensors determine that someone is attempting to speak to the user or get the user's attention. Accordingly, the force device 100 enables alternate forms of feedback, directional information, and notifications to be generated for a user.

In some embodiments, the force control module 115 is configured to receive force events from other devices (e.g., a smartphone or mobile computer). Additionally, in some embodiments, the force control module 115 receives sensor data acquired via one or more sensors (not shown in FIGS. 1A-1C), generate force events based on sensor data, and generate control signals to reposition the one or more masses 110 to exert forces on the user. For example, and without limitation, when a force control module 115 receives a force event, the force control module 115 may query one or more sensors and calculate the necessary mass 110 positions to exert a force specified by the force event, given the current orientation and/or position of the user (e.g., the current orientation/position of the head of the user). The force control module 115 then repositions the masses 110, if applicable, by activating the corresponding actuators 114 to exert a force on the user along those vector(s).

When the masses 110 are positioned in the manner shown in FIGS. 1A-1C, the center of gravity of the force device 100 may be aligned with a center axis of the head and/or body of the user. In this neutral configuration, when the user is standing or sitting upright, the force device 100 may not exert any significant directional forces on the user. By contrast, when the masses 110 are positioned asymmetrically (e.g., off the center axis of the head and/or body of the user) on the tracks 112 (e.g., as shown in FIG. 2), directional forces are exerted on the user. For example, and without limitation, the force control module 115 could position mass 110-2 on the track 112 towards the front 134 of the force device 100, shifting the center of gravity of the force device 100 forward and causing a forward force to be exerted on the user. In various embodiments, a forward force may be generated by the force device 100 in order to instruct the user to move in a forward direction, to direct the user's interest towards an object located in front of the user, and/or to simulate an action or experience in which the head of the user would be pushed or pulled forward. In addition, the magnitude of the forward force may be increased by also positioning mass 110-1 and/or mass 110-3 towards the front 134 of the force device 100. In some embodiments, the magnitude of the forward force may indicate the distance for which the user should move in a forward direction, the importance of an object located in front of the user, or the degree to which the action or experience, such as gravity or another type of acceleration, would push or pull the head of the user.

Further, when the force control module 115 positions mass 110-2 on the track 112 towards the rear 136 of the force device 100, the center of gravity of the force device 100 shifts backward, causing a backward force to be exerted on the user. In various embodiments, a backward force may be generated by the force device 100 in order to instruct the user to step backwards, to instruct the user to turn 180°, to direct the user's interest towards an object located behind the user, and/or to simulate an action or experience in which the head of the user would be pushed or pulled backwards. In addition, the magnitude of the backward force may be increased by also positioning mass 110-1 and/or mass 110-3 towards the rear 136 of the force device 100.

In some embodiments, the magnitude of the backward force may indicate the distance for which the user should move in a backward direction (e.g., by turning 180° and walking forward), the importance of an object located behind the user, or the degree to which the action or experience would push or pull the head of the user backwards. Further, the magnitude of the forward force or the backward force may be based on a magnitude of movement required for the user to correct his or her posture, such as the distance a user should move his or her shoulders and/or back to properly align the spine of the user.

Additionally, when the force control module 115 positions mass 110-1 and mass 110-3 towards the left side 132 or right side 130 of the force device 100, the center of gravity of the force device 100 shifts to the left or to the right, respectively, causing a left tilting force or a right tilting force to be exerted on the user. In various embodiments, a left tilting force or a right tilting force may be generated by the force device 100 in order to instruct the user to navigate to the left or to the right, to direct the user's interest towards an object located to the left or to the right of the user, to correct the posture of a user that is leaning to the left or to the right, and/or to simulate an action or experience in which the head of the user would be pushed or pulled to the left or to the right.

In addition, the magnitude of the left tilting force or the right tilting force may be increased by positioning mass 110-1 and/or mass 110-3 towards the leftmost or rightmost portion of the tracks 112, respectively. By contrast, the magnitude of the left tilting force or the right tilting force may be decreased by positioning mass 110-1 and/or mass 110-3 along the tracks 112 towards the center of the force device 100. In some embodiments, the magnitude of the left tilting force or the right tilting force may indicate the distance for which the user should move to the left or to the right, how many degrees the user should turn to the left or to the right, the importance of an object located to the left or to the right of the user, or the degree to which the action or experience would push or pull the head of the user to the left or to the right. Further, the magnitude of the left tilting force or the right tilting force may be based on a magnitude of movement required for the user to correct his or her posture, such as the distance a user must shift his or her center-of-gravity to maintain his or her balance.

In some embodiments, one or more masses 110 may be repositioned to exert off-axis forces, such as forward-left tilting forces, forward-right tilting forces, backward-left tilting forces, and backward-right tilting forces. For example, and without limitation, a forward-left tilting force could be exerted on a user by positioning mass 110-1 towards the front 134 of the force device 100 while mass 110-2 and mass 110-3 remain in the positions shown in FIGS. 1A-1C, causing the center of gravity to shift forward and to the left. In another non-limiting example, a backward-right tilting force could be exerted on a user by positioning mass 110-3 towards the rear 136 of the force device 100 while mass 110-1 and mass 110-2 remain in the positions shown in FIGS. 1A-1C, causing the center of gravity to shift backward and to the right. Such off-axis forces could be generated by the force device 100 in order to instruct the user to navigate in a more specific direction (e.g., a southeast (SE) direction, a north-northwest (NNW) direction, etc.), to direct the user's interest towards an object located in a specific direction relative to the user, to correct the posture of a user that is leaning towards a specific direction, and/or to simulate an action or experience in which the head of the user would be pushed or pulled in a specific direction.

In some embodiments, the force device 100 may exert a force having a magnitude intended to affect the head of the user or a force having a larger magnitude that is intended to affect the overall balance of the user, thereby causing the body of the user to move in a specific direction. For example, and without limitation, whereas a relatively small force affects only the head of the user, a larger force may influence the user's entire body. In the first technique, the user may perceive a slight force to their head and interpret the force as a hint to direct their attention towards a certain direction. By contrast, in the second technique, the user may perceive a force that is applied to the head as instead being applied to their entire body (e.g., due to lateral flexion of the neck or spine) and interpret the force as an instruction to walk or navigate in a certain direction.

Once a force has been exerted on the user, the force control module 115 may monitor the sensors and adjust the positions of the masses 110, as needed, to adjust the center of gravity and continue to exert the desired force on the user. Then, once the user has reached a desired position and/or orientation, the force control module 115 may return the masses 110 to a neutral position. For example, and without limitation, once the user has reached a desired position/orientation, the force control module 115 could reposition the masses 110 to align the center of gravity of the force device 100 with a center axis of the head and/or body of the user, such that no forces are exerted on the user.

Although the force device 100 shown in FIGS. 1A-1C and 2 is a head-mounted device, in other embodiments, the force device 100 may be positioned at other locations on a user. For example, and without limitation, the force device 100 could be a shoulder-mounted device that exerts forces on the upper torso of the user. Additionally, in some embodiments, the force device 100 could be a waist-mounted device or a leg-mounted device that exerts forces on the lower torso or legs of the user. In still other embodiments, the force device 100 could be integrated with clothing, jewelry, armbands, other types of wearables, handheld devices, pocket-sized devices, etc. in order to exert forces on a user's hand, arm, or other body part. For example, and without limitation, the force device 100 could be integrated with a smartphone which senses that a user is approaching an intersection and, in response, moves one or more masses 110 towards a left side of the smartphone to instruct the user to turn left at the intersection.

Additionally, multiple force devices 100 may be operated in conjunction with one another to exert forces in multiple directions, enabling a fuller range of force directions to be achieved. For example, and without limitation, a first force device 100 could provide forces along the x-axis on a first body part, while a second force device 100 exerts forces along the y-axis on a second body part. Moreover, even when implemented along the same axis/axes, multiple force devices 100 could be used to indicate the importance of an instruction, alert, or notification. For example, and without limitation, a force device 100 integrated with shoulder pads could exert a subtle force notification to the shoulders of a user, a force device 100 integrated with a head-worn device could exert a more significant force notification to the head of the user, and both force devices 100 could exert forces when a notification is of importance.

Although the masses 110 shown in FIGS. 1A-1C and 2 are solid weights, in other embodiments, the force device 100 may include any other technically feasible type of mass that is capable of being repositioned to modify the center of gravity of the force device 100 in order to exert a force on a user. In some embodiments, the force device 100 may include fluid masses, such as liquids and/or gases, that are moved between tubes and/or reservoirs to modify the center of gravity of the force device 100. Further, although the masses 110 described herein are shown as being moved to specific positions on the force device 100 via tracks 112, in other embodiments, the masses 110 may be moved to other positions on the force device 100 via other techniques. For example, and without limitation, in some embodiments, a greater (e.g., 4 or more) or lesser (e.g., 1 or 2) number of masses 110 may be coupled to the force device 100 at one or more different positions and selectively moved to exert various types of singular or cumulative forces on the user. Examples of alternate types of masses 110, alternate placement of masses 110 on the force device, and alternate techniques for moving masses to modify the center of gravity of the force device 100 are described below in conjunction with FIGS. 4A-8D.

In various embodiments, the force device 100 includes one or more sensors that track the position and/or orientation of the force device 100 and/or track various aspects of the surrounding environment. The sensor(s) may include, without limitation, global navigation satellite system (GNSS) devices, magnetometers, inertial sensors, gyroscopes, accelerometers, visible light sensors, thermal imaging sensors, laser based devices, ultrasonic sensors, infrared sensors, radar sensors, and/or depth sensors, such as time-of-flight sensors, structured light sensors, etc. These sensor(s) may enable the position of the force device 100 to be tracked in absolute coordinates (e.g., GPS coordinates) and/or relative to objects in the surrounding environment.

In some embodiments, the sensor(s) are disposed in the force control module(s) 115. Data acquired by the sensor(s) could then be used to generate force events within the force device 100 or the sensor data may be transmitted to a separate device for analysis. In the same or other embodiments, one or more of the sensors may be disposed within an auxiliary device, such as a smartphone, mobile computer, wearable device, etc.

Further, in various embodiments, the force device 100 includes one or more actuators 114 that reposition masses 110 associated with the force device 100. The actuator(s) 114 may include, without limitation, electric motors, piezoelectric motors, magnetic actuators, hydraulic actuators, pneumatic actuators, pumps, etc. For example, and without limitation, with reference to FIGS. 1A-1C, the actuators 114 may include electric motors that are coupled to the tracks 112 and move along the length and/or width of the tracks 112 to reposition the masses 110. In general, the actuators 114 enable the center of gravity of the force device 100 to be modified in order to exert forces on the user.

Figure 3:
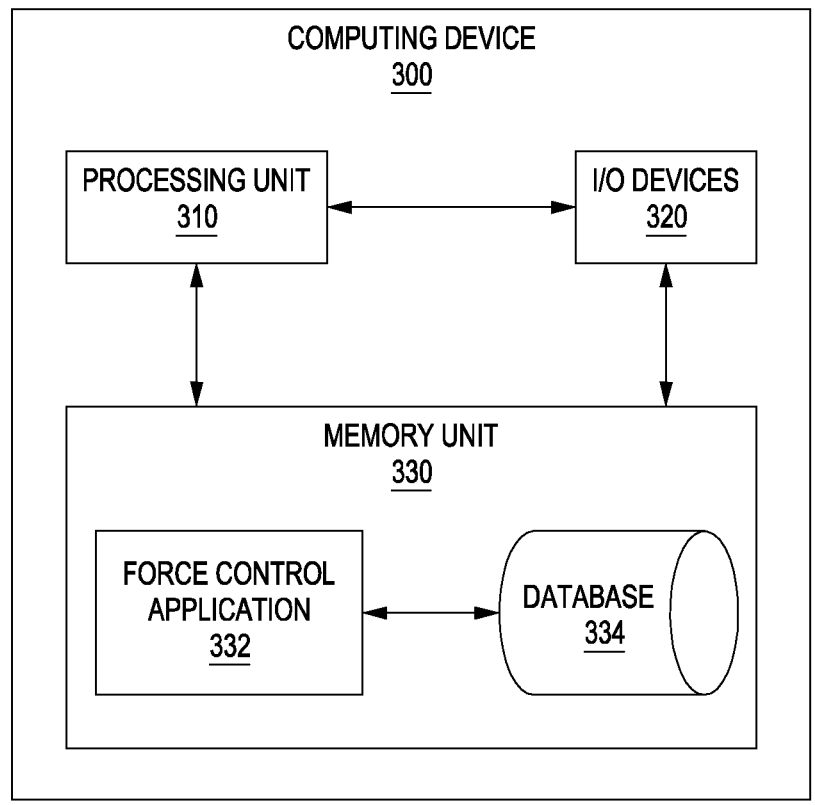
FIG. 3 is a block diagram of a computing device that may be implemented in conjunction with or coupled to the force device of FIGS. 1A-1C, according to various embodiments.
Figure 3:
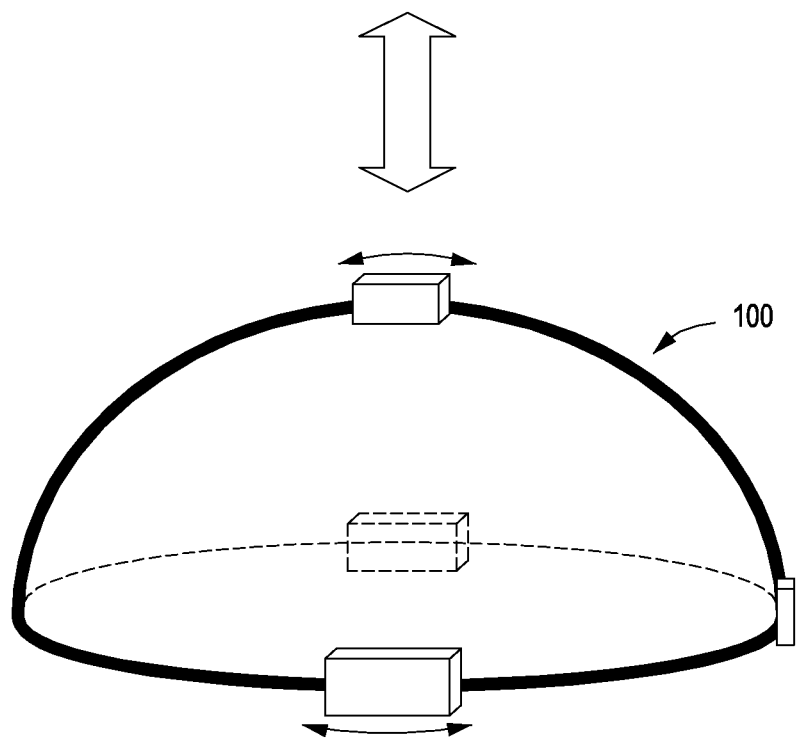

FIG. 3 is a block diagram of a computing device 300 that may be implemented in conjunction with or coupled to the force device 100 of FIGS. 1A-1C, according to various embodiments. As shown, computing device 300 includes, without limitation, a processing unit 310, input/output (I/O) devices 320, and a memory device 330. Memory device 330 includes a force control application 332 configured to interact with a database 334.

Processing unit 310 may include a central processing unit (CPU), digital signal processing unit (DSP), and so forth. In various embodiments, the processing unit 310 is configured to analyze sensor data acquired by one or more sensors to determine the position and/or orientation of the force device 100, determine the position and/or orientation of the masses 110, and/or to detect and/or identify objects in the surrounding environment. In some embodiments, the processing unit 310 is further configured to determine the position and/or orientation of the force device 100 relative to the surrounding environment and/or to receive and/or generate force events that are based on the position and/or orientation of the force device 100 and/or objects in the surrounding environment. For example, and without limitation, the processing unit 310 could execute the force control application 332 to analyze sensor data, determine that the force device 100 has a particular orientation and position, and generate a force event intended to cause the user to modify the orientation and position by exerting force(s) on the user by repositioning the masses 110. The processing unit 310 could further generate control signals (e.g., via the force control application 332) that cause actuators 114 to position the masses 110 to exert forces on the user until the force device 100 reaches a desired orientation and/or position.

I/O devices 320 may include input devices, output devices, and devices capable of both receiving input and providing output. For example, and without limitation, I/O devices 320 may include wired and/or wireless communication devices that send data to and/or receive data from the sensor(s) included in the force device 100. Additionally, the I/O devices 320 may include one or more wired or wireless communication devices that receive force events (e.g., via a network, such as a local area network and/or the Internet) that cause the actuators 114 to reposition the masses 110. The I/O devices 320 may further include actuator controllers, such as a linear actuator controller or a fluid pump controller.

Memory unit 330 may include a memory module or collection of memory modules. Force control application 332 within memory unit 330 may be executed by processing unit 310 to implement the overall functionality of the computing device 300, and, thus, to coordinate the operation of the force device 100 as a whole. The database 334 may store digital signal processing algorithms, navigation data, object recognition data, force event data, and the like.

Computing device 300 as a whole may be a microprocessor, an application-specific integrated circuit (ASIC), a system-on-a-chip (SoC), a mobile computing device such as a tablet computer or cell phone, a media player, and so forth. In some embodiments, computing device 300 is integrated in the force control module(s) 115 associated with the force device 100. Generally, computing device 300 may be configured to coordinate the overall operation of the force device 100. In other embodiments, the computing device 300 may be coupled to, but separate from the force device 100. In such embodiments, the force device 100 may include a separate processor that receives data (e.g., force events) from and transmits data (e.g., sensor data) to the computing device 300, which may be included in a consumer electronic device, such as a smartphone, portable media player, personal computer, wearable device, and the like. However, the embodiments disclosed herein contemplate any technically feasible system configured to implement the functionality of the force device 100.

Figure 4A:
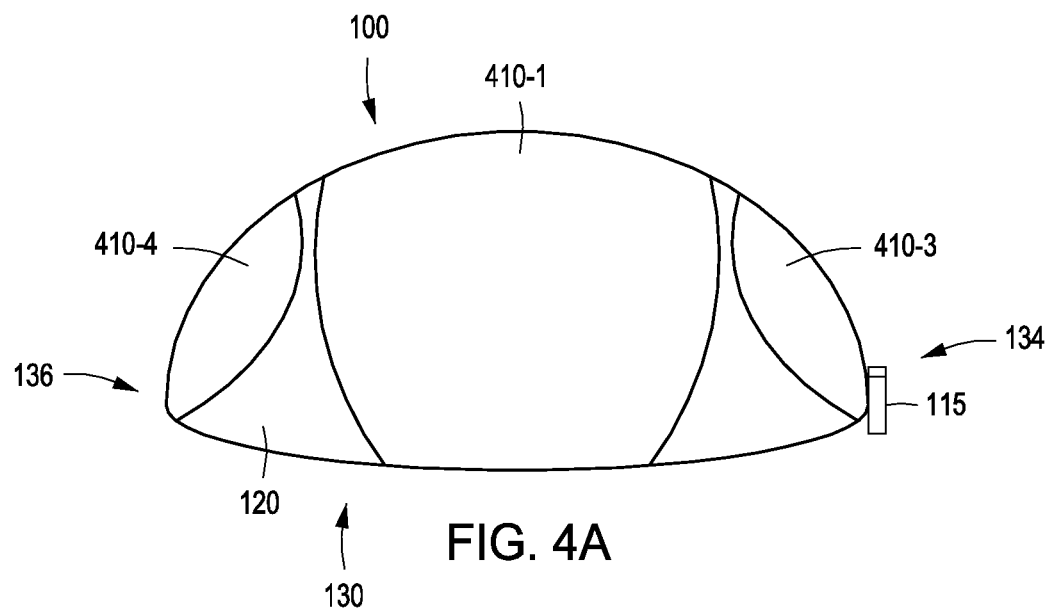
FIGS. 4A-4C illustrate a force device for exerting forces on a user via masses and baffles, according to various embodiments.
Figure 4B:
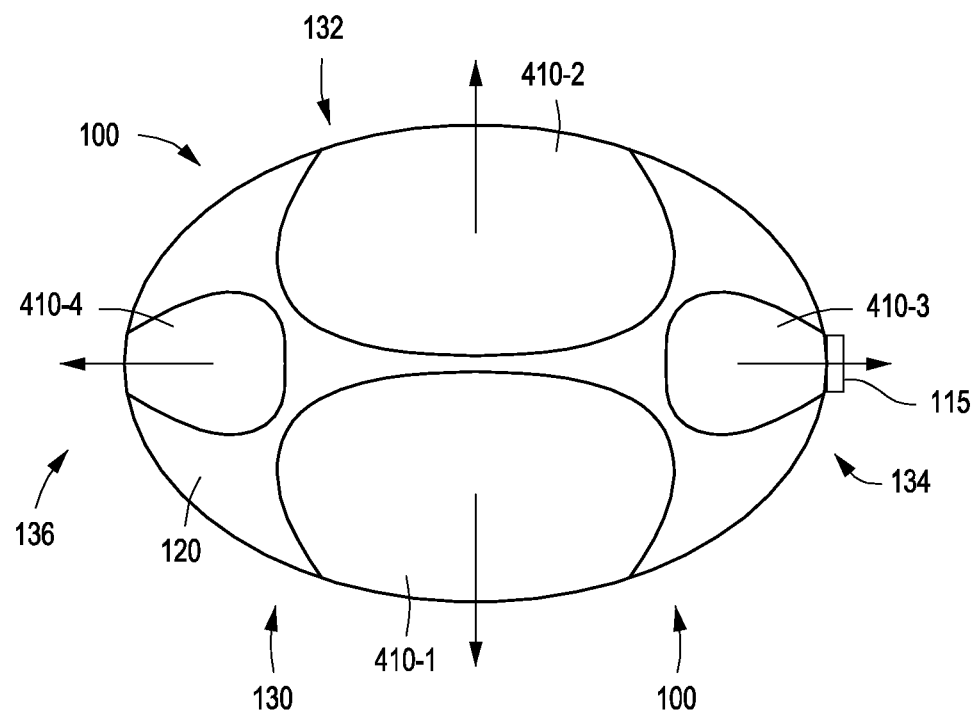
Figure 4C:
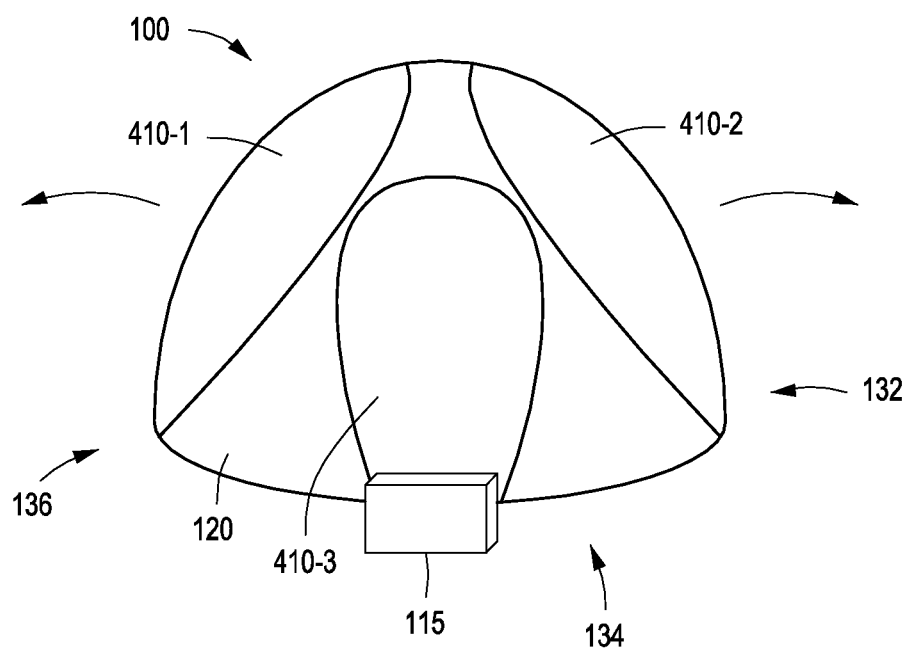
Figure 5A:
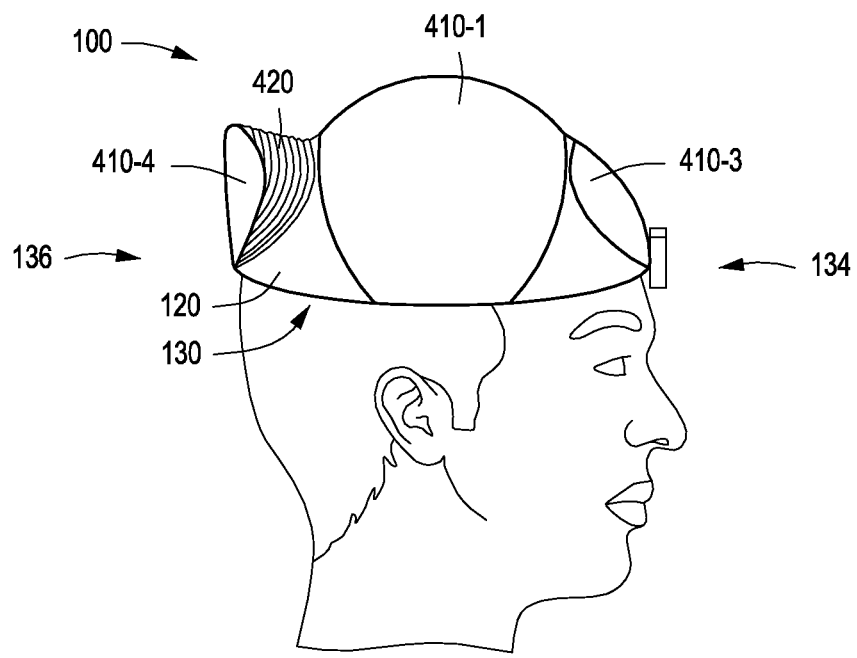
FIGS. 5A and 5B illustrate how different forces may be exerted on a user via the force device of FIGS. 4A-4C, according to various embodiments.

FIGS. 4A-4C illustrate a force device 100 for exerting forces on a user via masses 410 and baffles 420, according to various embodiments. When the masses 410 are positioned in the manner shown in FIGS. 4A-4C, the center of gravity of the force device 100 may be aligned with a center axis of the head and/or body of the user. By contrast, when the force control module 115 extends the baffle 420 coupled to mass 410-4 (e.g., via a pneumatic actuator), the center of gravity is shifted towards the rear 136 of the force device 100. Accordingly, a backward force is exerted on the user, as shown in FIG. 5A. In addition, the magnitude of the backward force may be adjusted by extending or retracting the baffle 420 and, thus, increasing or decreasing the distance of the mass 410-4 from the center of the force device 100. Further, a forward force is exerted on the user by extending a baffle 420 coupled to mass 410-3, shifting the center of gravity towards the front 134 of the force device 100.

Moreover, the magnitude of the forward force may be adjusted by extending or retracting the baffle 420 to increase or decrease the distance of mass 410-3 from the center of the force device 100.

Figure 5B:
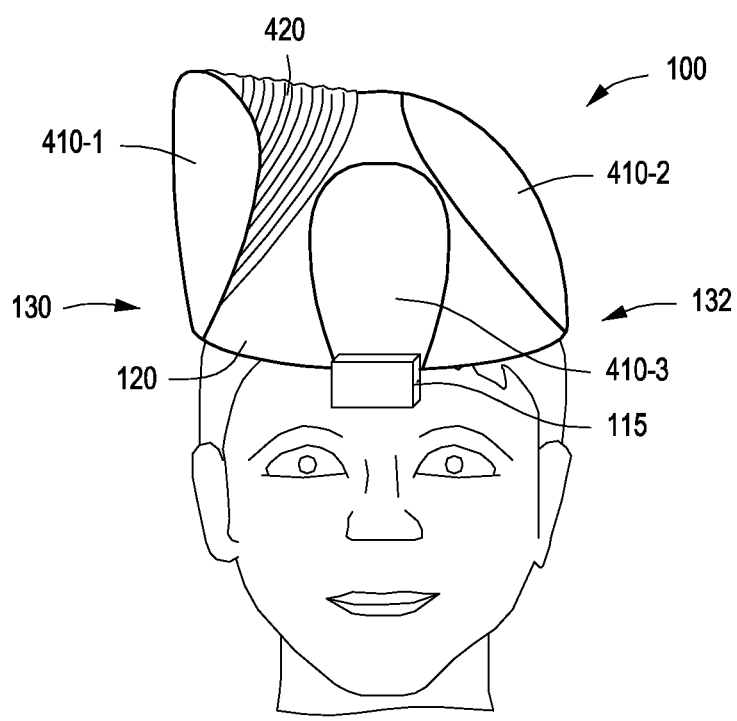

Additionally, when the force control module 115 extends the baffle 420 coupled to mass 410-1, the center of gravity is shifted towards the right side 130 of the force device 100. Accordingly, a right tilting force is exerted on the user, as shown in FIG. 5B. In addition, a left tilting force may be exerted on the user by extending and/or inflating a baffle 420 coupled to mass 410-2, shifting the center of gravity towards the left side 132 of the force device 100. Further, the magnitude of the right tilting force and the left tilting force may be adjusted by extending or retracting the corresponding baffle 420 to increase or decrease the distance of mass 410-1 and mass 410-2, respectively, from the center of the force device 100.

In some embodiments, one or more masses 410 can be repositioned to exert off-axis forces, such as forward-left tilting forces, forward-right tilting forces, backward-left tilting forces, and backward-right tilting forces. For example, and without limitation, a forward-right tilting force could be exerted on a user by extending the baffle 420 coupled to mass 410-1 while also extending the baffle 420 associated with mass 410-3, causing the center of gravity to shift forward and to the right. In another non-limiting example, a backward-left tilting force could be exerted on a user by extending the baffle 420 coupled to mass 410-2 while also extending the baffle 420 associated with mass 410-4, causing the center of gravity to shift backward and to the left.

Figure 6A:
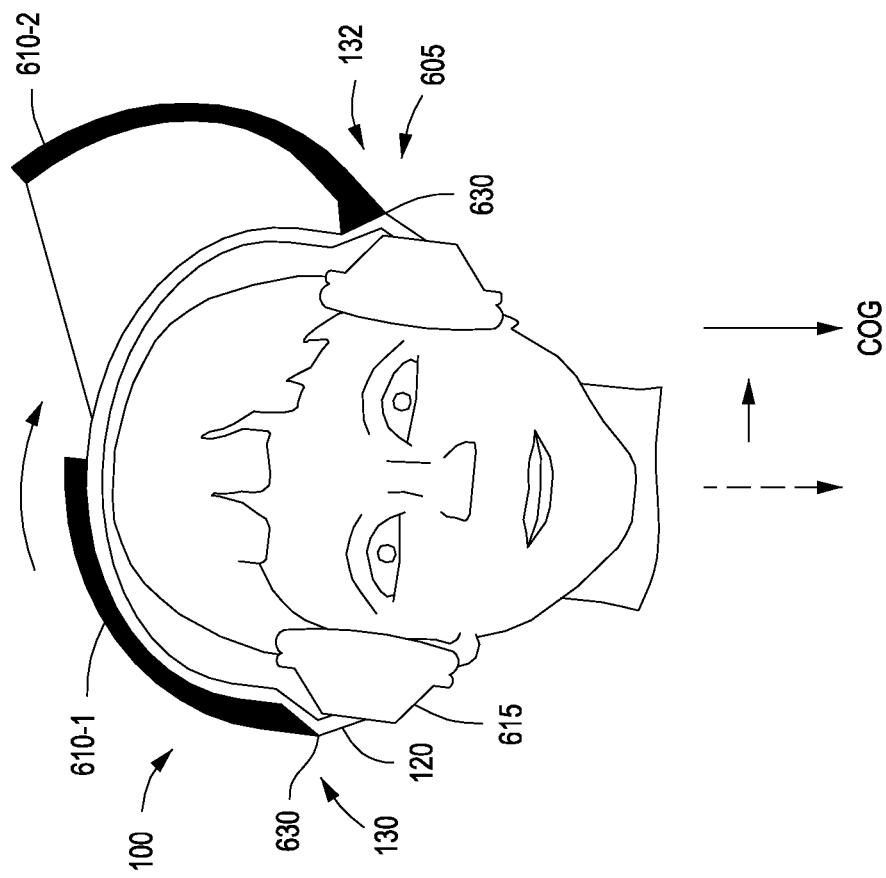
FIGS. 6A and 6B illustrate a force device implemented in conjunction with a pair of headphones, according to various embodiments.
Figure 6B:
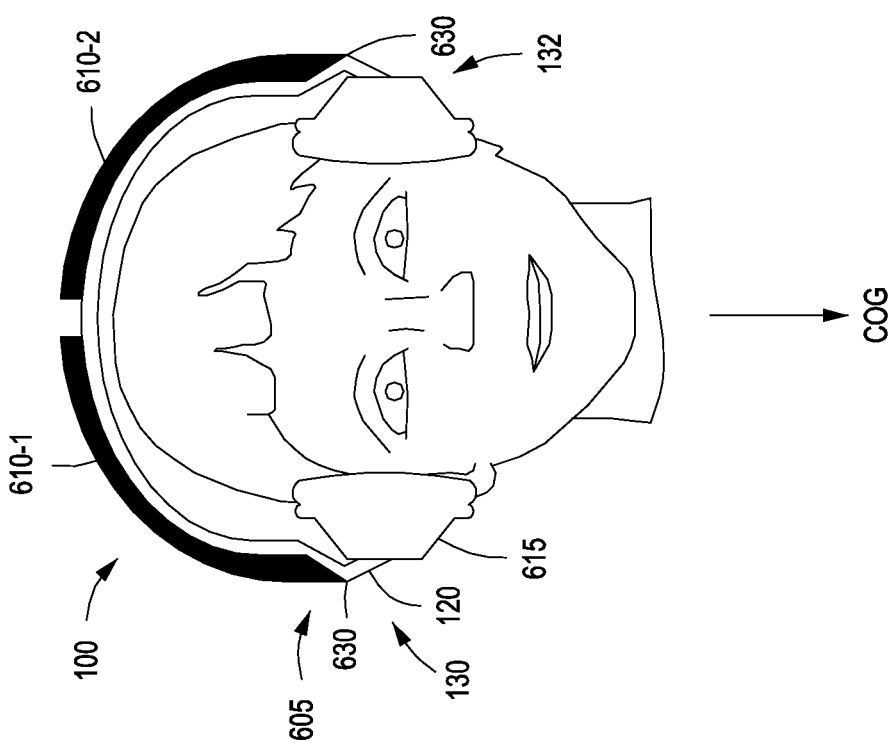

FIGS. 6A and 6B illustrate a force device 100 implemented in conjunction with a pair of headphones, according to various embodiments. As shown, the force device 100 may be a standalone device, or the force device 100 may be integrated with another device, such as a pair of headphones 605, a head mounted display, a smartphone, a virtual reality device, etc. When integrated with a pair of headphones 605, the force device 100 may include loudspeakers 615, a head support 120, and one or more masses 610 coupled to the head support 120 and/or the loudspeakers 615.

As shown in FIG. 6B, a left titling force may be exerted on the user when the force control module 115 rotates mass 610-2 about a hinge 630, shifting the center of gravity towards the left side 132 of the force device 100. Further, a right tilting force may be exerted on the user by rotating mass 610-1 about a hinge 630, shifting the center of gravity towards the right side 130 of the force device 100. In addition, the magnitude of the left tilting force and the right tilting force may be adjusted by rotating mass 610-2 and mass 610-1, respectively, towards or away from the center of the force device 100.

Figure 7B:
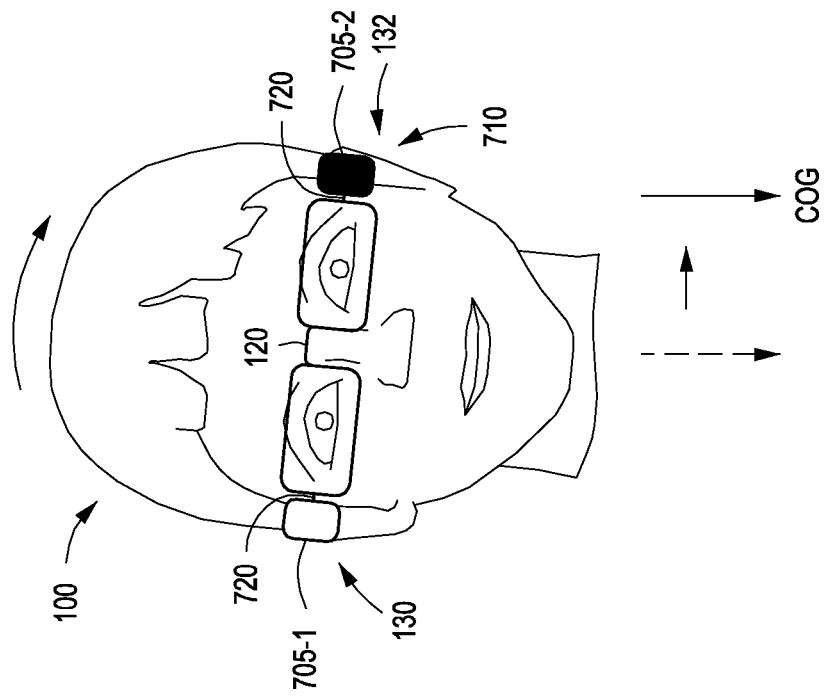
FIGS. 7A and 7B illustrate a force device for exerting forces on a user via a fluid mass and reservoirs, according to various embodiments.
Figure 7A:
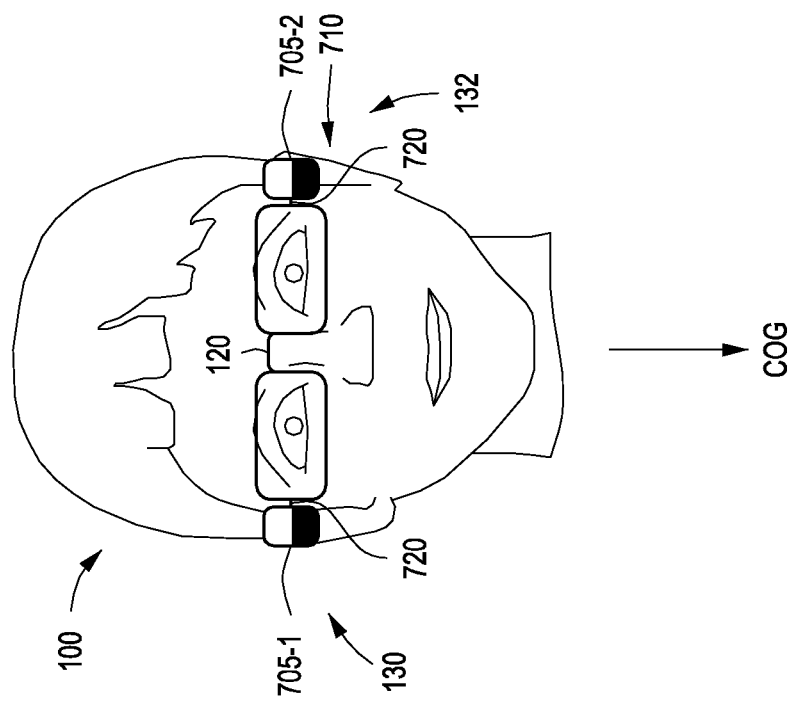

FIGS. 7A and 7B illustrate a force device 100 for exerting forces on a user via a fluid mass 710 and reservoirs 705, according to various embodiments. When the fluid mass 710 is distributed between reservoir 705-1 and reservoir 705-2 in the manner shown in FIG. 7A, the center of gravity of the force device 100 is aligned with a center line of the head and/or body of the user. By contrast, when the majority of the fluid mass 710 is moved through the channels 720 into reservoir 705-2, the center of gravity may be shifted towards the left side 132 of the force device 100, as shown in FIG. 7B. Accordingly, a left tilting force is exerted on the user. In addition, the magnitude of the left tilting force may be adjusted by increasing or decreasing the volume of the fluid mass 710 that is present in reservoir 705-2. Further, a right tilting force may be exerted on the user by moving a majority of the fluid mass 710 through the channels 720 into reservoir 705-1, shifting the center of gravity towards the right side 130 of the force device 100. Moreover, the magnitude of the right tilting force may be adjusted by increasing or decreasing the volume of the fluid mass 710 that is present in reservoir 705-1.

FIGS. 8A-8D illustrate a technique for providing navigational instructions to a user via a force device 100, according to various embodiments. As described above, the force device 100 may include one or more sensors capable of tracking the position and/or orientation of the force device 100 and/or tracking various aspects of the surrounding environment. In some embodiments, the sensors may be used for navigational purposes. For example, and without limitation, a user that is walking or jogging could execute a navigation application on a smartphone, and the smartphone could be paired with a force device 100. Accordingly, instead of disrupting the user with visual and/or auditory navigation instructions, the force device 100 could exert forces (e.g., left tilting forces and right tilting forces) when the user needs to turn down a particular street.

Figure 8A:
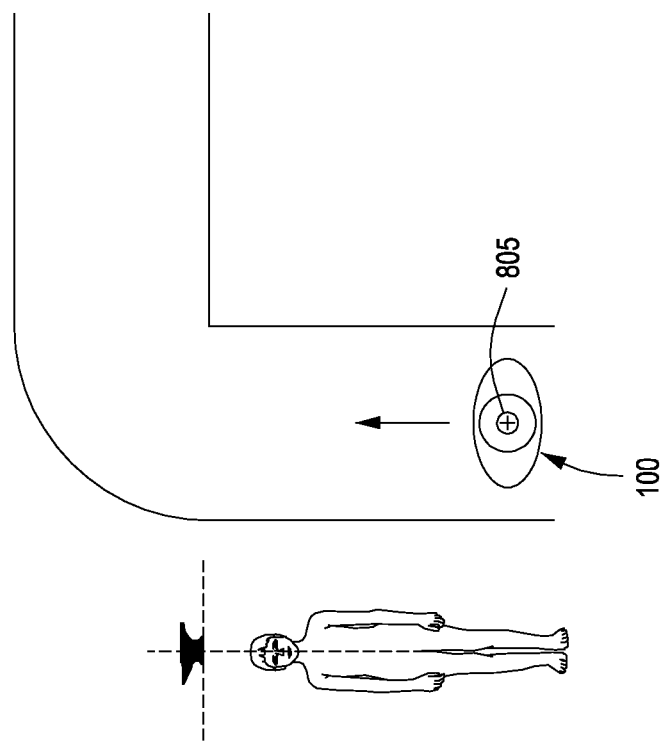
FIGS. 8A-8D illustrate a technique for providing navigational instructions to a user via a force device, according to various embodiments.
Figure 8B:
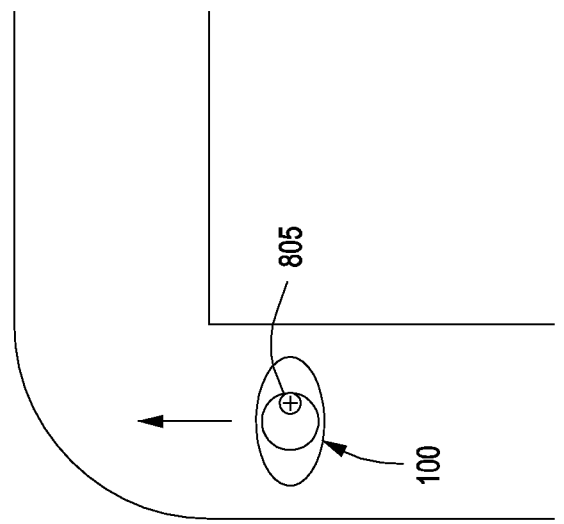
Figure 8D:
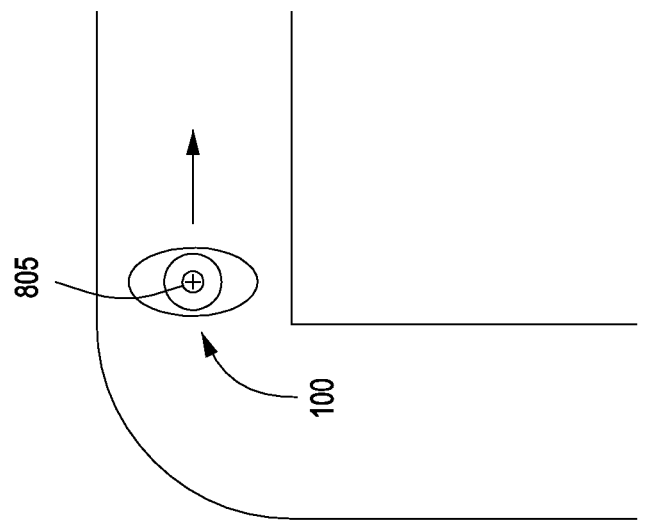
Figure 8C:
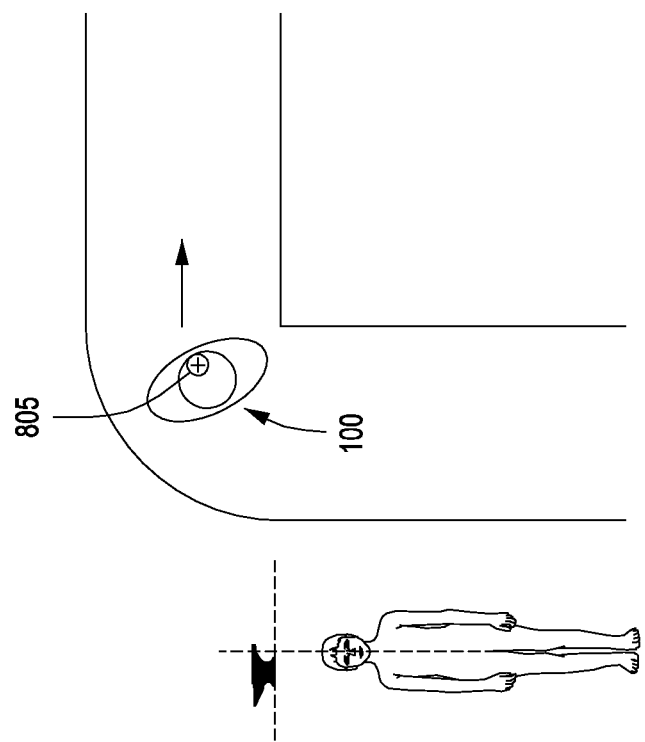

For example, and without limitation, the force device 100 could monitor the position of the user and, when the user needs to turn right, the force device 100 could generate a right tilting force to nudge the user's head to the right, as shown in FIG. 8B. Further, as the user is in the process of turning, the sensor(s) could detect the change in the location and orientation of the user and reposition the masses 110 to exert the appropriate forces to continue to direct the user in the correct direction, as shown in FIG. 8C. Then, after turning down the correct street, the force device 100 could return the masses 110 to a neutral position, as shown in FIG. 8D. In addition, when the user arrives at his or her destination, the force device 100 could generate a specific force pattern to indicate that the user has reached his or her destination.

In some embodiments, various types of force devices 100, such as those described above, could be integrated with a safety device, such as a system that identifies potential dangers in the surrounding environment and issues alerts to warn a user of the potential dangers. In such embodiments, the force device 100 could analyze the user's surroundings via the sensors and detect potential dangers. Then, when the force device 100 detects a dangerous condition, the force device 100 could apply a force to cause the user to turn his or her head towards the dangerous condition, such as a car pulling out of a driveway.

In another non-limiting example, the force device 100 could be integrated with a head-worn surround (e.g., hemispheric) imager that captures a 360° panorama around the user, or any other sensor that captures information associated with the environment surrounding the user. For example, and without limitation, an imager or sensor could identify a bird in a tree located behind the user. The force device 100 could then exert a force (e.g., an up and to the right force) on the user to indicate that the user—an avid birder—should direct his or her gaze up and to the right.

In yet another non-limiting example, the force device 100 could be integrated with an augmented reality (AR) head-mounted device (HMD). As a user walks down a street and operates the force device 100, the HMD could display various AR information associated with objects in the surrounding environment. Then, when an object associated with AR information is outside of the user's field of view, the force device 100 could exert a force to direct the user's attention towards the object. For example, and without limitation, the force device 100 could include a GNSS sensor that determines the user is passing by an apartment building with a noteworthy apartment on the third floor. In response, the force device 100 could exert a force instructing the user to direct his or her gaze towards the apartment so that AR information associated with the apartment could be provided to the user.

In yet another non-limiting example, the force device 100 could include gyroscopic sensors, accelerometers, and/or imagers to detect when a user stumbles or loses his or her balance. In such a situation, the force device 100 could exert one or more forces to the head or body of the user to attempt to prevent the user from falling and/or to correct the user's balance. For example, and without limitation, one or more sensors included in the force device 100 may detect that the posture of the user is outside of a threshold range (e.g., an angular range). In response, the force device 100 could exert one or more forces to influence the posture of the user until the posture is back within the threshold range. Additionally, forces could be exerted on the head or body of the user when the force device 100 detects via one or more sensors that the user is about to walk into an object, such as a light pole or fire hydrant.

In some embodiments, the force device 100 could provide alerts for subconscious body movements, commonly referred to as stereotypy, being performed by the user. Stereotypy may include repetitive movements, postures, or utterances, such as body rocking, self-caressing, crossing/uncrossing of legs, and marching in place. Accordingly, gyroscopic sensors, accelerometers, imagers, etc. could be implemented to detect such movements and exert a force to bring the movements to the attention of the user. Additionally, the force device 100 could exert forces to compensate for slight movements of the user's head or body that the user would like to cancel out. In such embodiments, the force device 100 could recognize an involuntary body movement pattern and generate a force pattern having substantially the same magnitude, but opposite phase/direction, in order to cancel out the undesired body movement pattern.

Figure 9:
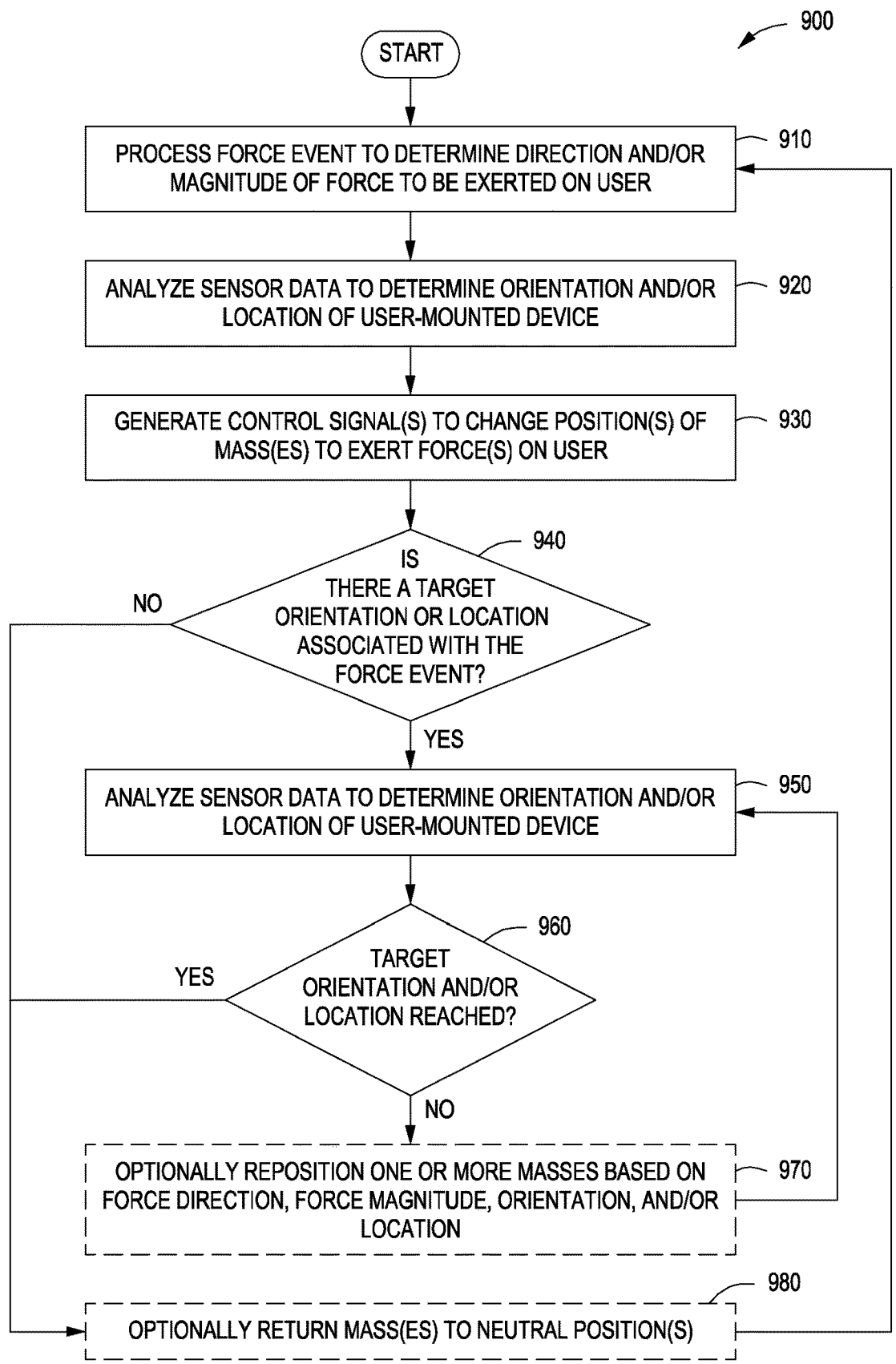
FIG. 9 is a flow diagram of method steps for exerting forces on a user, according to various embodiments.

FIG. 9 is a flow diagram of method steps for exerting forces on a user, according to various embodiments. Although the method steps are described in conjunction with the systems of FIGS. 1A-8D, persons skilled in the art will understand that any system configured to perform the method steps, in any order, falls within the scope of the various embodiments.

As shown, a method 900 begins at step 910, where the force control application 332 receives or generates a force event and processes the force event to determine a force direction and/or a force magnitude. As described above, forces of various types and magnitudes may be generated in order to provide instruction, alerts, notifications, etc. to the user. In some embodiments, the force direction indicated by the force event may include a direction relative to the user, or the force direction may include an absolute direction (e.g., based on geographic cardinal directions).

At step 920, the force control application 332 analyzes sensor data to determine the orientation and/or position (e.g., relative coordinates or absolute coordinates) of the force device 100. In various embodiments, the orientation and/or position of the force device 100 may indicate how the masses should be repositioned in order to generate a force having a direction and/or magnitude specified by the force event. Accordingly, at step 930, the force control application 332 generates control signals to reposition one or more masses based on the force direction indicated by the force event, the force magnitude indicated by the force event, the orientation of force device 100, and/or the position of force device 100.

Next, at step 940, the force control application 332 determines whether a target orientation or position is specified by the force event. In some embodiments, a target orientation may include a threshold range (e.g., an angular range or distance range) associated with the user's posture, head orientation, body orientation, etc. Additionally, in some embodiments, a target position may include geo coordinates. If no target orientation or target position is specified by the force event, then the method 900 proceeds to step 980, where the force control application 332 optionally generates control signals to return the one or more masses to neutral positions (e.g., starting positions). The method 900 then returns to step 910, where the force control application 332 waits to receive or generate an additional force event.

If, however, at step 940, a target orientation or a target position is specified by the force event, then the method 900 proceeds to step 950, where the force control application 332 analyzes the sensor data to detect the orientation and/or the position of the force device 100. At step 960, the force control application 332 determines whether the user has complied with and/or properly responded to the force(s) by determining whether the force device 100 is in the target orientation and/or at the target position.

If, at step 960, the force control application 332 determines that the force device 100 is not in the target orientation and/or not at the target position, then the method 900 proceeds to step 970, where the force control application 332 optionally repositions one or more masses based on the force direction indicated by the force event, the force magnitude indicated by the force event, the orientation of force device 100, and/or the position of force device 100. The method 900 then returns to step 950, where the force control application 332 analyzes the sensor data to detect the orientation and/or the position of the force device 100.

If, however, at step 960, the force control application 332 determines that the force device 100 is in the target orientation and/or at the target position, then the method 900 proceeds to step 980, where the force control application 332 optionally generates control signals to return the one or more masses to neutral positions. The method 900 then returns to step 910, where the force control application 332 waits to receive or generate an additional force event.

In sum, the force control application receives or generates a force event indicating a force direction and/or a force magnitude. The force control application then determines, based on sensor data, the orientation and/or the position of the force device. The force control further determines a force to be exerted on the user via one or more masses based on the force event as well as the orientation and/or the position of the force device. Next, the force control application generates control signals to reposition the one or more masses in order to exert the appropriate force on the user.

At least one advantage of the techniques described herein is that information can be provided to a user without overwhelming the user's visual and auditory channels. Accordingly, the user can receive instructions, alerts, and notifications while simultaneously receiving other types of information via his or her visual and/or auditory channels, without creating potentially dangerous situations. Further, by exerting forces on the user in response to changes to the orientation of the force device, the techniques described herein can assist a user in maintaining his or her balance and/or posture.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A system for exerting forces on a user, the system comprising:
   a user-mounted device including one or more masses;
   one or more sensors configured to acquire sensor data; and
   one or more processors coupled to the one or more sensors and configured to:
      determine, based on the sensor data, at least one of an orientation or a position of the user-mounted device relative to a surrounding environment;
      generate, based on the sensor data, a force event by identifying an object or condition associated with the surrounding environment, wherein the force event is associated with a force direction that is associated with the identified object or condition in the surrounding environment;
      compute a force to be exerted on the user via the one or more masses based on (i) the force direction associated with the force event, and (ii) at least one of the orientation or the position of the user-mounted device relative to the surrounding environment; and
      generate, based on the computed force, an actuator control signal to change a position of the one or more masses relative to the user-mounted device.

2. The system of claim 1, wherein the one or more processors are further configured to determine that at least one of the orientation or the position has changed, and, in response, generate a second actuator control signal to reposition at least one mass relative to the user-mounted device.

3. The system of claim 1, wherein the one or more processors are configured to compute the force to be exerted on the user by computing a center of gravity associated with the one or more masses.

4. The system of claim 1, wherein the user-mounted device further comprises one or more actuators coupled to the one or more processors and configured to reposition the one or more masses relative to the user-mounted device based on the actuator control signal.

5. The system of claim 4, wherein the one or more masses comprise one or more weights, the user-mounted device further includes one or more tracks, and the one or more actuators are configured to move the one or more weights along the one or more tracks based on the actuator control signal.

6. The system of claim 4, wherein the one or more masses comprise one or more weights, the user-mounted device further includes one or more hinges, and the one or more actuators are configured to rotate the one or more weights about the one or more hinges based on the actuator control signal.

7. The system of claim 4, wherein the one or more masses comprise a fluid mass, the user-mounted device further includes one or more tubes, and the one or more actuators are configured to move at least a portion of the fluid mass through the one or more tubes based on the actuator control signal.

8. The system of claim 1, wherein the force is computed based on the orientation of the user-mounted device, and the one or more processors are further configured to determine that the user-mounted device has reached a target orientation associated with the force event, and, in response, generate a second actuator control signal to reposition the one or more masses relative to the user-mounted device.

9. The system of claim 1, wherein the one or more sensors comprise at least one of a global navigation satellite system (GNSS) receiver, a magnetometer, an accelerometer, or an optical sensor.

10. One or more non-transitory computer-readable storage media including instructions that, when executed by one or more processors, configure the one or more processors to exert forces on a user, by performing the steps of:
    determining, based on sensor data acquired from one or more sensors, at least one of an orientation or a position of a force device relative to a surrounding environment;
    generating, based on the sensor data, a force event by identifying an object or condition associated with the surrounding environment, wherein the force event is associated with a force direction that is associated with the identified object or condition in the surrounding environment;
    computing a force to be exerted on the user via one or more masses included in the force device based on (i) the force direction associated with the force event, and (ii) at least one of the orientation or the position of the force device relative to the surrounding environment; and
    generating, based on the computed force, an actuator control signal to change a position of the one or more masses relative to the force device.

11. The one or more non-transitory computer-readable storage media of claim 10, wherein the force event is associated with a navigation instruction, and the one or more processors are configured to generate the actuator control signal to change the position of the one or more masses relative to the force device in response to determining that the force device is approaching a street intersection.

12. The one or more non-transitory computer-readable storage media of claim 11, wherein the one or more processors are further configured to:
    receive a second force event associated with a second navigation instruction;
    compute a second force to be exerted via the one or more masses based on a second force direction associated with the second force event and at least one of the orientation or the position of the force device; and
    generate a second actuator control signal to reposition the one or more masses based on the second force in response to determining that the force device is approaching a second street intersection.

13. The one or more non-transitory computer-readable storage media of claim 10, wherein the force device comprises a head-mounted device, and the orientation and the position of the head-mounted device comprise a head orientation and a head position, respectively.

14. The one or more non-transitory computer-readable storage media of claim 10, further comprising generating the force event by identifying an object in the surrounding environment, wherein the object is located in the force direction relative to the force device.

15. The one or more non-transitory computer-readable storage media of claim 10, further comprising generating the force event in response to determining that the orientation of the force device is outside of a threshold range, wherein the force is configured to be exerted on the user to instruct the user to return the force device to within the threshold range.

16. The one or more non-transitory computer-readable storage media of claim 15, wherein the sensor data is acquired via an angular sensor, and the threshold range comprises an angular range associated with a posture of the user.

17. The one or more non-transitory computer-readable storage media of claim 15, wherein the sensor data is acquired via a magnetometer, and the threshold range is associated with a direction towards a destination to which the user is navigating.

18. The one or more non-transitory computer-readable storage media of claim 10, further comprising determining that the orientation has changed based on the sensor data, and, in response, repositioning at least one mass based on an updated orientation.

19. A method for exerting forces on a user, the method comprising:
    determining, based on sensor data acquired from one or more sensors, at least one of an orientation or a position of a user-mounted device relative to a surrounding environment;
    generating, based on the sensor data, a force event by identifying an object or condition associated with the surrounding environment, wherein the force event is associated with a force direction that is associated with the identified object or condition in the surrounding environment;
    computing a force to be exerted on the user via one or more masses included in the user-mounted device based on (i) the force direction associated with the force event, and (ii) at least one of the orientation or the position of the user-mounted device relative to the surrounding environment; and
    generating, based on the computed force, an actuator control signal to change a position of the one or more masses relative to the user-mounted device.

20. The method of claim 19, wherein the force event is associated with a navigation instruction, and generating the actuator control signal is performed in response to determining that the user-mounted device is approaching a street intersection.

* * * * *